United States Patent
Chen et al.

(10) Patent No.: US 8,477,606 B2
(45) Date of Patent: Jul. 2, 2013

(54) ASSURED PACKET DATA SERVICES ASSOCIATED WITH COMMUNICATION NETWORKS

(75) Inventors: Jen Mei Chen, San Diego, CA (US); Mark Maggenti, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 11/625,473

(22) Filed: Jan. 22, 2007

(65) Prior Publication Data

US 2008/0175263 A1 Jul. 24, 2008

(51) Int. Cl.
*G01R 31/08* (2006.01)

(52) U.S. Cl.
USPC .......................................... 370/230

(58) Field of Classification Search
USPC ......... 370/328, 329, 338, 348, 395.2, 395.21, 370/230, 230.1, 231, 235
See application file for complete search history.

(56) References Cited

U.S. PATENT DOCUMENTS

| | | | |
|---|---|---|---|
| 6,535,485 B1 * | 3/2003 | Story ............................ | 370/231 |
| 6,640,248 B1 | 10/2003 | Jorgensen | |
| 7,031,720 B2 * | 4/2006 | Weerakoon et al. ........ | 455/452.2 |
| 7,035,645 B2 * | 4/2006 | Hitzeman ...................... | 455/453 |
| 7,185,092 B2 | 2/2007 | Furui et al. | |
| 2001/0005890 A1 | 6/2001 | Nitaki | |
| 2001/0024434 A1 | 9/2001 | Ayyagari et al. | |
| 2003/0233572 A1 * | 12/2003 | Van Ackere et al. .......... | 713/200 |
| 2004/0015602 A1 * | 1/2004 | Goldhammer et al. ....... | 709/235 |
| 2004/0151308 A1 | 8/2004 | Kacker et al. | |
| 2004/0165528 A1 | 8/2004 | Li et al. | |
| 2005/0130641 A1 | 6/2005 | Lorraine Scott | |
| 2006/0056432 A1 * | 3/2006 | Azarov ......................... | 370/412 |
| 2006/0135172 A1 | 6/2006 | Dronne et al. | |
| 2006/0251011 A1 * | 11/2006 | Ramakrishnan et al. ..... | 370/328 |

(Continued)

FOREIGN PATENT DOCUMENTS

| | | |
|---|---|---|
| CN | 1466833 A | 1/2004 |
| JP | 2006514510 A | 4/2006 |

(Continued)

OTHER PUBLICATIONS

International Search Report and Written Opinion—PCT/US2007/063376, International Search Authority—European Patent Office—Sep. 14, 2007.

(Continued)

*Primary Examiner* — Mark Rinehart
*Assistant Examiner* — Peter Cheng
(74) *Attorney, Agent, or Firm* — Darren M. Simon

(57) ABSTRACT

A service for Public Safety (PS) and Law Enforcement (LE) users on commercial wireless networks which assure them access to packet data services. The service request is application based. The applications that are for official use, by the PS/LE users, could have a reserved priority level associated with them. The reserved priority level could be higher than a normal commercial user. The network could use the priority to distinguish users, and dynamically allocate and optimize network resources. The network could use priority level information to perform access, admission, and congestion control. The PS/LE user could use the official applications while on duty and un-official ones while off duty, thus, additionally freeing up network resources. The PS/LE users could then use advanced commercial packet data services, without the need for a private network, while at the same time making it feasible for commercial networks.

29 Claims, 12 Drawing Sheets

U.S. PATENT DOCUMENTS

| | | | |
|---|---|---|---|
| 2007/0047478 A1* | 3/2007 | Balachandran et al. | 370/328 |
| 2008/0165793 A1* | 7/2008 | Abel et al. | 370/412 |
| 2009/0279568 A1* | 11/2009 | Li et al. | 370/468 |

FOREIGN PATENT DOCUMENTS

| | | |
|---|---|---|
| RU | 2004119554 A | 3/2005 |
| RU | 2273103 C2 | 3/2006 |
| WO | 0154440 A1 | 7/2001 |
| WO | 03046742 A1 | 6/2003 |
| WO | 2005020597 A2 | 3/2005 |
| WO | 2005029787 A1 | 3/2005 |

OTHER PUBLICATIONS

Taiwanese Search Report—09610958—TIPO—Mar. 23, 2010.
Preserving Privacy in Environments with Location-Based Applications (Jan.-Mar. 2003).

* cited by examiner

ASSURED PACKET DATA SERVICES ASSOCIATED WITH COMMUNICATION NETWORKS

BACKGROUND

1. Field

The disclosed aspects relate generally to commercial data communication networks, and more specifically to assured access for packet data services.

2. Background

Government Public Safety (PS) and Law Enforcement (LE) agencies typically use private Land Mobile Radio (LMR) systems as their primary means of voice communications. Government agencies generally own their own resources, and these private networks are expensive to build and maintain. As a result, commercial networks are typically more advanced in technology than these private networks.

Commercial networks now have a wide variety of advanced data services and applications available for their users. For example, CDMA2000 1xEV-DO will provide data rates up to 3.1 Mbps to an individual user for access to e-mail, the web, secure access to corporate virtual private networks, location based services, transmission of pictures and video. Similar services are not available on LMR networks, nor are they contemplated in the near future. Being able to fully utilize advanced data services is desired by Government PS/LE users. LMR systems have stringent requirements concerning the level of reliability for their users. It is important for the official users to have almost guaranteed access to the system.

Thus, one reason that commercial communication networks are not used by Government agencies is that these systems cannot assure the PS/LE user access to communications services when the commercial network is likely to be congested. For example, all commercial cellular systems were described as "ineffective and unresponsive" in the first hours after the attack on the Pentagon on Sep. 11, 2001.

There are existing efforts to try and assure access on communications networks when congested. The National Communications System (NCS) is a government agency responsible for assuring National Security and Emergency Preparedness (NS/EP) government users reliable access to wired and wireless communications services in times of emergency. The NCS operates the Government Emergency Telecommunications Network (GETS), which allows NS/EP users priority access to the landline Public Switched Telecommunications Network (PSTN) communications resources, even if the PSTN is congested. GETS is implemented as an additional features in commercial PSTN switches. GETS provides priority access on a call by call basis, where the user dials a GETS access phone number (1-710-NCS-GETS) and then provides a user ID and password after being prompted. Since GETS is user-based, rather than device based, GETS users are not limited to obtaining priority while using a single device. NCS has been working to make these priority access features available to users on commercial wireless networks as well. While many features have been included in the CDMA standards that facilitate providing priority access, these features have not generally implemented in commercial systems.

Recently, NCS has defined a priority access service for wireless networks known as Wireless Priority Service (WPS). WPS is in the process of being deployed by the major CDMA carriers in the US. CDMA cellular users access WPS by pre-pending their destination phone number with a WPS access code (*272). This code is recognized by cellular mobile switching equipment as a request for WPS service. The device is validated as being authorized to receive WPS service by checking appropriate provisioning records in a cellular home location register (HLR) or SS7 service control point (SCP). If WPS service is successfully authorized, and no resources are currently available to complete the call, the user's call is queued. This call is completed when resources become available, and receives priority over new non-WPS calls which are also contending for the same open channels. This will provide PS/LE users with priority over commercial cellular users in gaining access to the cellular network should the network become congested. However, this service is only for voice services. WPS does not provide priority access for cdma2000 1XRTT packet data calls, nor is it available on the new high-speed packet data (EV-DO) networks.

In addition, when an emergency occurs, the 1xRTT and 1xEV-DO networks may become congested due to increased use by the public to get information related to the emergency event. It may become difficult for the PS/LE user to make a voice call; the delay in completing a voice call may increase greatly.

Similarly, assuming that the commercial public's use of data applications also increases in times of emergency, the effective throughput on the DO network is reduced for any unofficial data applications which have not previously requested and been granted PS/LE priority treatment. Therefore, there is a need in the art to provide solutions to the above identified problems.

SUMMARY

The various aspects disclosed herein are directed to a method and an apparatus that provide packet data services on a wireless communications network for official Government agency users giving them the ability to conveniently utilize commercial packet data services with assured access even when the network is congested while at the same time allowing the network the ability to optimize resources.

In some aspects, a method is provided in which a request from an access terminal requesting for access based on at least one application is received at an access point associated with a communication network, wherein the at least one application is associated with at least one of official use and unofficial use. Thereafter, an acceptance for access is transmitted to the access terminal, wherein the acceptance is based on the use associated with the at least one application and at least one communication path with the access terminal is established for the at least one application.

In some aspects, a method comprises transmitting a request for access to the communications network based on at least one application, wherein the at least one application is associated with at least one of official use and unofficial use; receiving an acceptance for access from the communications network, wherein the acceptance is based on the use associated with the at least one application; and establishing at least one communication path with the communications network for the at least one application. Other benefits, features and advantages of the various aspects will become apparent from the following detailed description, figures and claims. It should be understood, however, that the detailed description and the specific examples, are given by way of illustration only, since various changes and modifications within the spirit and scope of the invention will become apparent to those skilled in the art from this detailed description.

DETAILED DESCRIPTION

The word "exemplary" is used herein to mean serving as an example, instance, or illustration. Any aspect described herein as "exemplary" is not necessarily to be construed as preferred or advantageous over other aspects. An "official user" is herein to mean a public safety, a law enforcement, or equivalent Government user. An "un-official" user is herein to mean any other user that is not official.

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The various aspects disclose a method and an apparatus that assure packet data services on a communications network. The method and apparatus could be used by official users to have assured access for packet data services on a wireless commercial communications network. The method comprises the steps of establishing a session between an access terminal (AT) and access point (AP) both of which are part of a communications network, receiving a request for services from an AT, transmitting an acceptance for access to the AT, and establishing the communication paths. The requesting, accepting, and establishing of packet data services are based on an official or un-official use application provided on the AT. This application based requesting, amongst other things, could be used by the network to distinguish users, allocate and manage network resources, and give priority access to official use applications.

Figure 1:
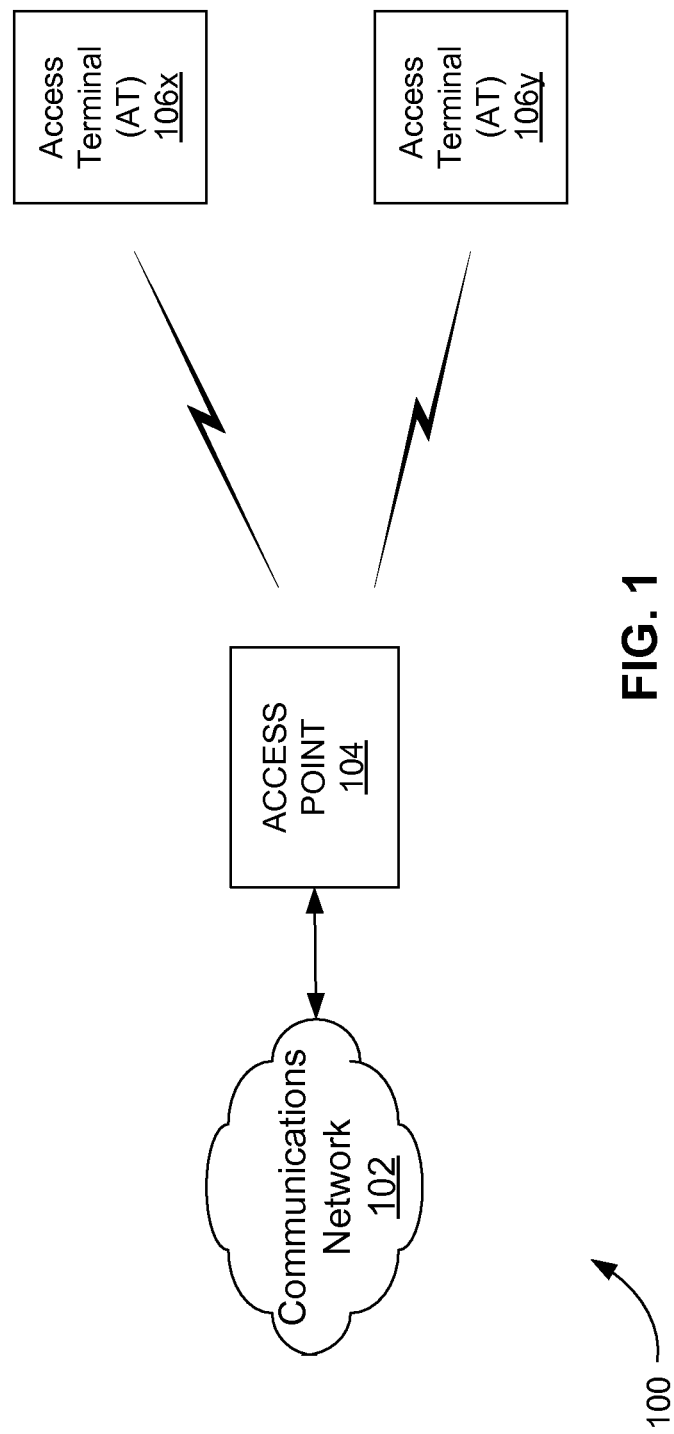
FIG. 1 shows a block diagram of a wireless commercial communications network.

FIG. 1 shows an exemplary high level view of a wireless commercial communications network 100. Access terminals 106x and 106y are in communication with an access point 104 which is connected to communications network 102. An access point is generally a fixed station that communicates with the user terminals and may also be referred to as a base station or some other terminology. Only two access terminals and one access point are shown for illustration purposes. However, it is well known in the art that a typical wireless communications network has many access points and terminals. The communications network 102 is anything that facilitates end-to-end communication, and could include for example a PSTN/ISDN, MSC, DSL, subscriber databases, WLAN, other access points, POTS, or the Internet.

Figure 2:
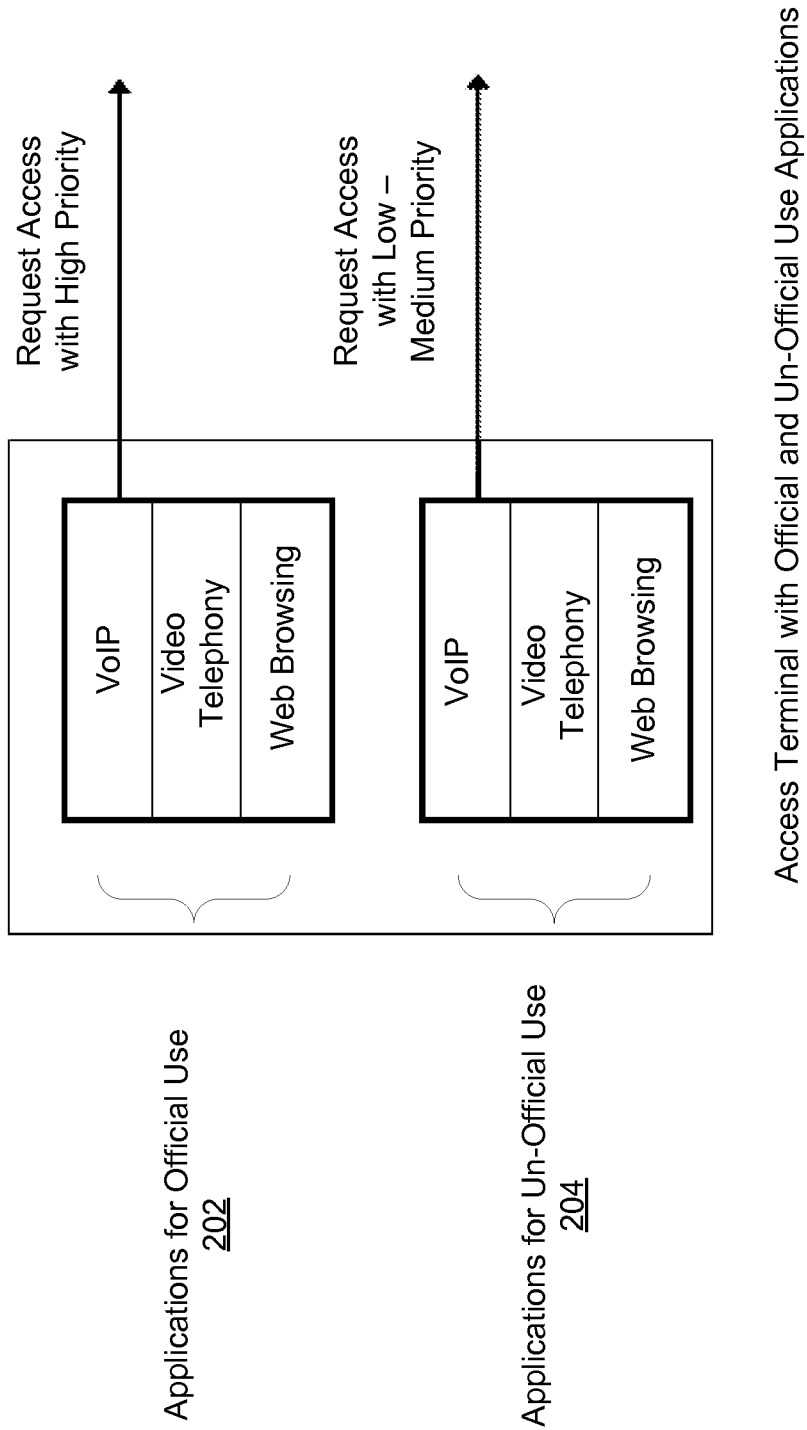
FIG. 2 shows an exemplary conceptual diagram of an access terminal with official and unofficial applications running on it.

In the various aspects an AT comprises official use and un-official use applications. An AT could include, but is not limited to, any type of terminal device that provides means for wireless communication associated with a wireless communication network. For example, the AT may comprise a laptop, a personal digital assistant (PDA), or mobile phone. The access request is based on which one of the two types of applications requested the access. FIG. 2 demonstrates an AT 200 that contains applications for official use 202 and applications for un-official use 204. The term "applications" is used herein to mean both official and un-official use applications. An example of the types of applications that could be for official use and un-official use are VoIP, Video Telephony, file transfers, and Web Browsing. These are examples of the types of applications, but any application that utilizes packet data could be considered an applicable application. An optional feature could be that official users would use official use applications while on duty and use un-official use applications while not on duty. This could help optimize resources by allowing an official user to use official use applications on an "as need basis." In addition, by having the access request based on the application, this could relieve the official user of having to enter a prepending number or password and ID for each call as is required by the WPS and GETS systems.

In another aspect an optional feature would be to require a security login in order to open, launch, or use official use applications. For example, a private PIN or password could be used. Other biometric information could be used as a secure login feature. For example, the official user's finger print or voice print could be used as a login to the official use application. Once logged in, the official user could use the official use application or applications, without a need to reenter a secure login, until the user logs out. This would provide a security feature and prevent other users from launching or accessing the official use applications.

Figure 3:
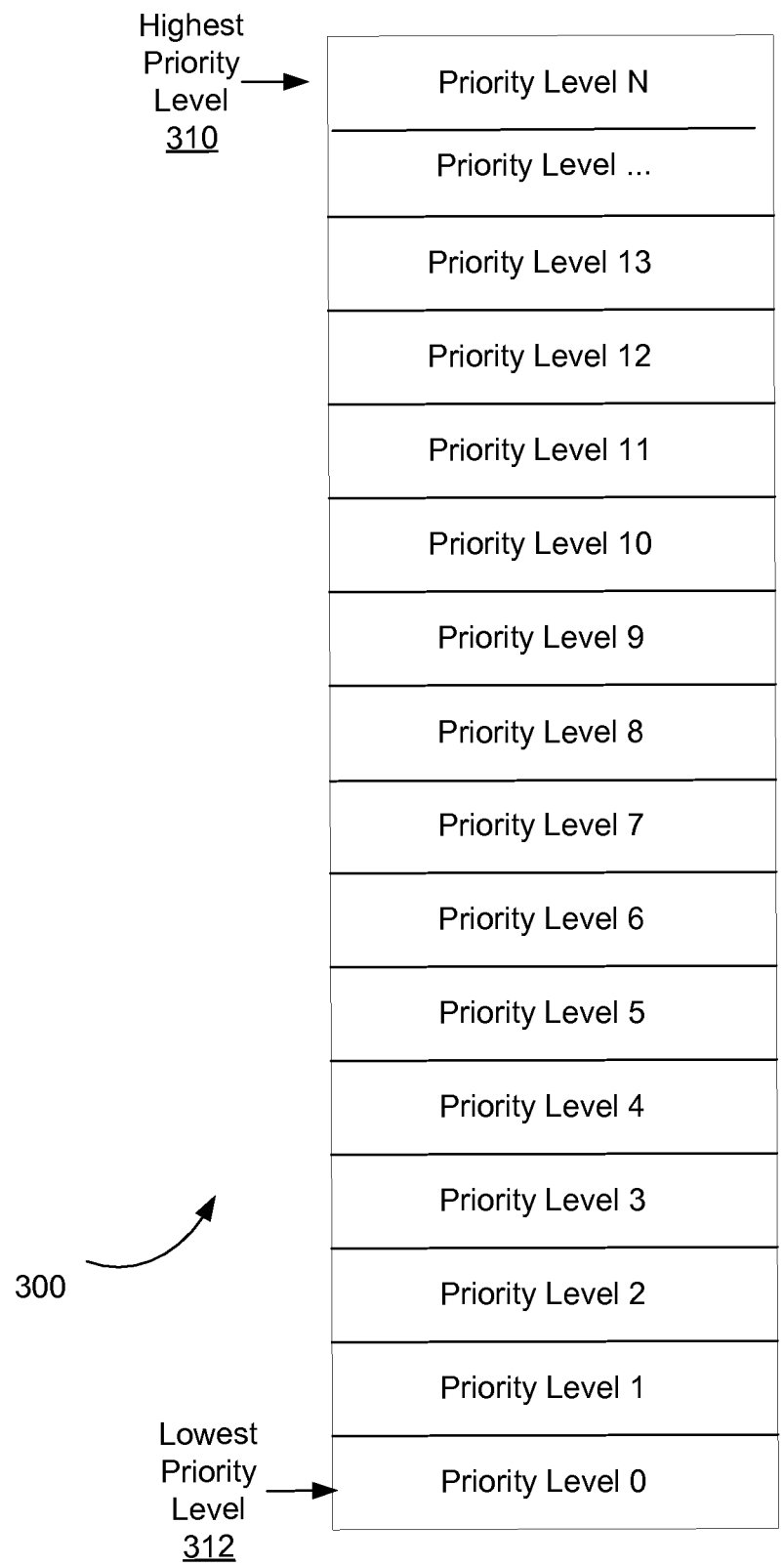
FIG. 3 shows an exemplary range of varying degrees of priority levels.

In another aspect the applications could have a priority associated with them. The official use applications could have a high priority and the unofficial use applications could have a medium or low priority associated with them. FIG. 3 shows an example of how priorities for the official and un-official use applications could work. A range of priority levels 300 from the lowest priority level 312 to the highest priority level 310 is shown. In this example, applications for official use could be assigned priorities that are from the top six priority levels, and un-official use applications could be assigned the priority levels that are lower than the top six priority levels. Any configuration of assigning the priority levels to the applications are possible as long as the official use applications have a higher priority than those for un-official use applications. The priority levels could enable the network to distinguish official users from un-official users therefore allowing the networks the ability to fully optimize network resources and guarantee the official users access.

Figure 6:
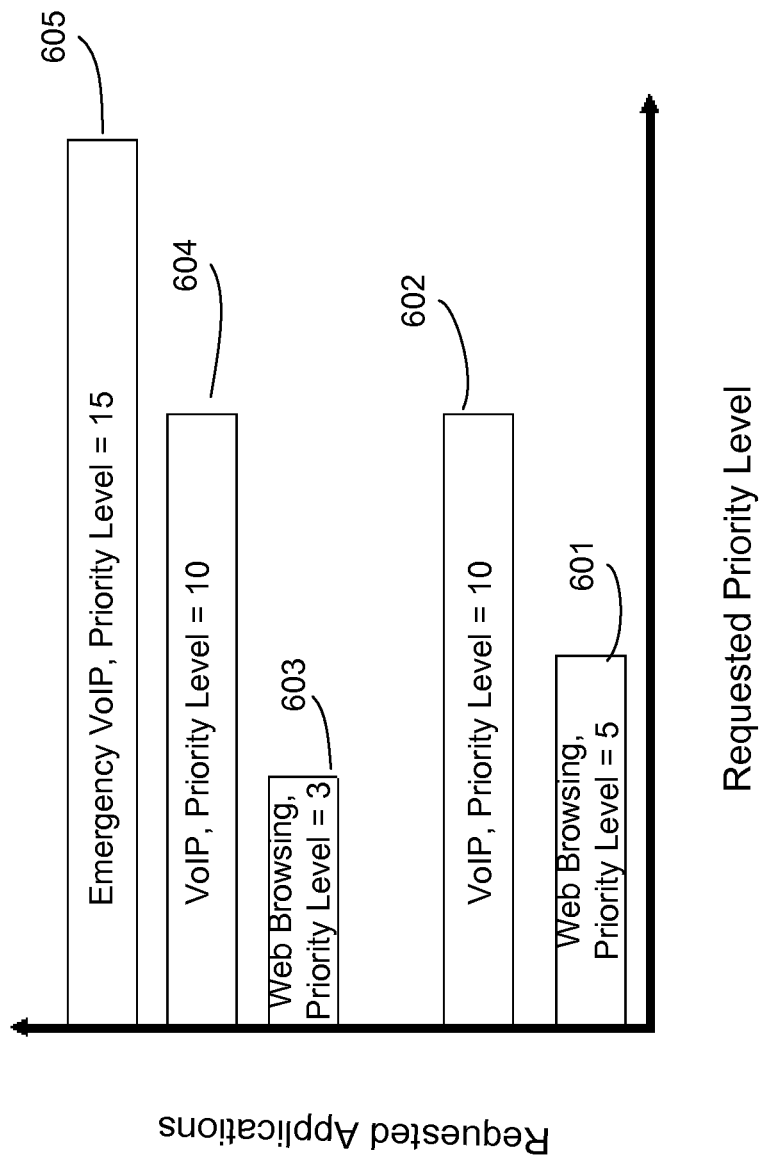
FIG. 6 shows an exemplary concept of using varying degrees of priority levels for official and unofficial applications.

In another optional aspect applications on an AT could have varying degrees of priority levels. In addition, the priority levels per application could vary from AT to AT. FIG. 6 demonstrates this feature: an official user's AT could have an official VoIP 605 with a priority level of 15, an off duty un-official VoIP 604 with a priority level of 10, and an off duty unofficial web browsing 603 with a priority level of 3. An un-official user's AT could have a VoIP 602 with a priority level of 10, and a web browsing 601 with a priority level of 5. The ability to vary the priority levels between applications and users would allow optimized use of the communication resources, and provide customized services to varying groups of users.

In another optional aspect the priority level associated with each application could be preprogrammed in the AT and statically associated with the applications, or the priority level could be dynamic. For example, an official user under certain circumstances may need to have a higher priority access for an application that was previously associated with it. The user could update the priority level to gain higher access. For example, an official user could receive an authorization over-the-air for higher priority access and update the official use application priority. The updated priority could be temporary and expire after a given time and return the normal operation level. Allowing certain groups or users the flexibility to customize their application priorities, either statically or dynamically, would enable the groups or users the ability to tailor services to their individual needs.

Figure 4:
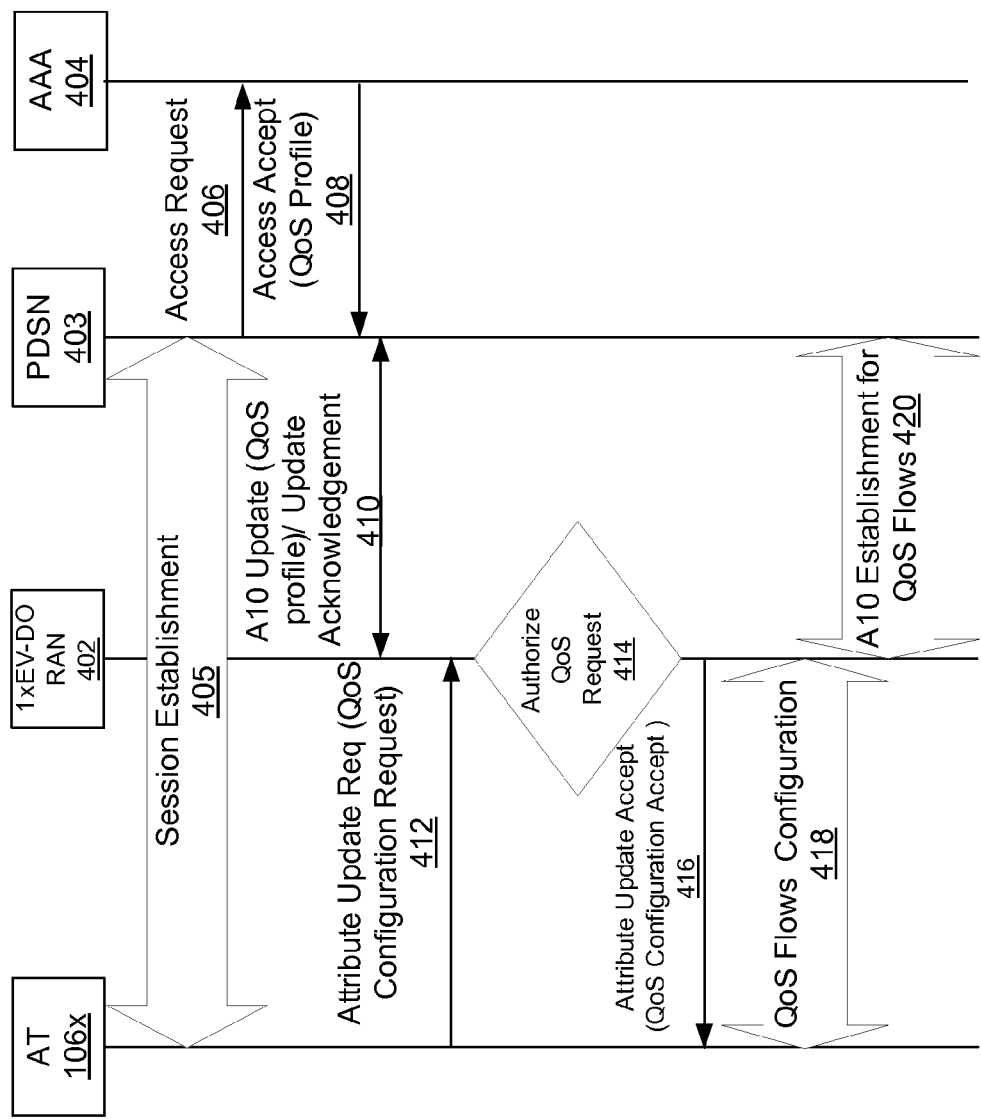
FIG. 4 shows a call flow configuring QoS for an access terminal on a 1xEV-DO network.

FIG. 4 demonstrates an example of how the various aspects could be used on a 1xEV-DO network 400. The various aspects could be used on other networks as well, such as a GSM network, and is not meant to be limited to a 1xEV-DO network which is shown herein for exemplarily purposes. 1xEV-DO networks are well known in the art and no further description of the network or its terminology is disclosed in this document. First a packet data session is established 405 for an AT 106x. The PDSN 403 sends an access request 406 to the AAA 404. The AAA returns 410 the AT's subscriber profile 408 which includes the QoS profile to the 1xEV-DO RAN 402. In addition, the PDSN performs authorization on some of the QoS parameters. In an aspect, authorization and configuration of the QoS flows could be done at the network and access terminal (AT) prior to QoS activation and usage. This would allow for quick activation of the QoS flow(s) when a packet data connection is established. The AT sends a QoS configuration request 412 to the 1xEV-DO RAN, and the RAN authorizes the request 414 based on the AT's QoS profile. Once authorized, the RAN sends a QoS configuration acceptance 416 to the AT. The RAN configures 418 the RLP flows and the RLMAC flow for the AT. Finally, the RAN and the AT establish a connection 420 for each flow. Once the QoS flows are configured and activated an AT could make a connection request based on an official or unofficial use application. The RAN attempts to admit the requested flows based on the requested priority of the flows. Once admitted the RAN allocates sector resources and sets up the flow connections. Each QoS has its own A10 connection over the RAN-PDSN interface. Each application typically has its own QoS flow associated with it. An application could have more than one flow. Stored in the AAA is the users QoS profile which keeps track of the users priority levels. The QoS profile indicates the maximum flow priority a user is authorized to have for a particular flow. In an aspect it would be useful for the network to able to distinguish an official use application or official user over other un-official use applications or un-official users.

One solution would be to provide this information in the AAA's subscriber QoS profile. The official user when launching or using an official use application on their AT would request a high priority QoS flow. The AAA could use a range of QoS flow priorities such as the exemplary range shown in FIG. 3 wherein there is a reserved priority level or range of priority levels for official use applications and users. The AAA or network could use these priority levels to distinguish an official user from an unofficial user or official use applications from un-official use applications. For example, the AAA could have a priority range from 0-15 and reserve the top five levels for only official users. Commercial users or un-official users could then use the priority levels from 0-10. The network could utilize this information to manage billing and accounting. For example, the network could distinguish users and bill them accordingly. The network could even distinguish billing for the official use and un-official use applications on a single device.

Figure 5A:
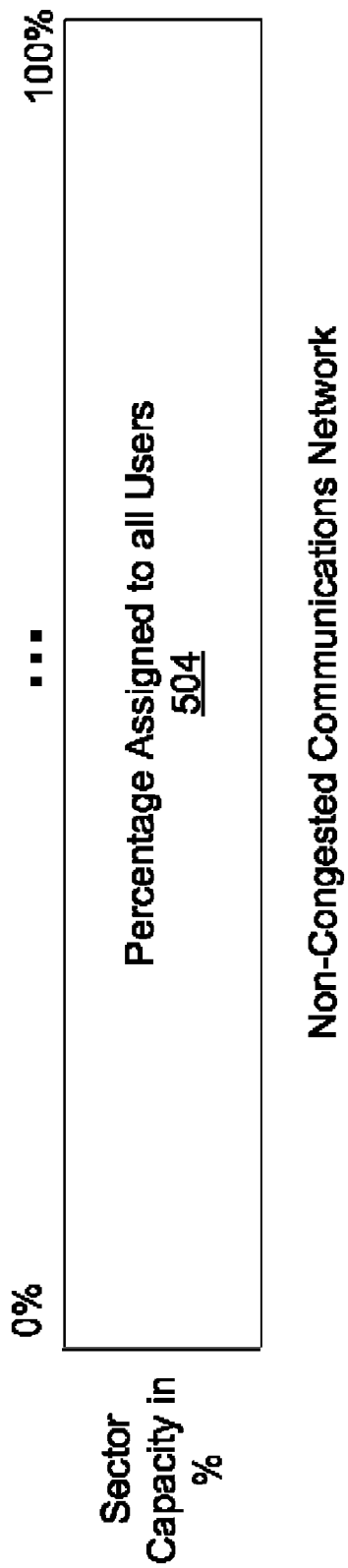
FIG. 5A shows an exemplary concept for allocating sector capacity in a non-congested communications network.
Figure 5B:
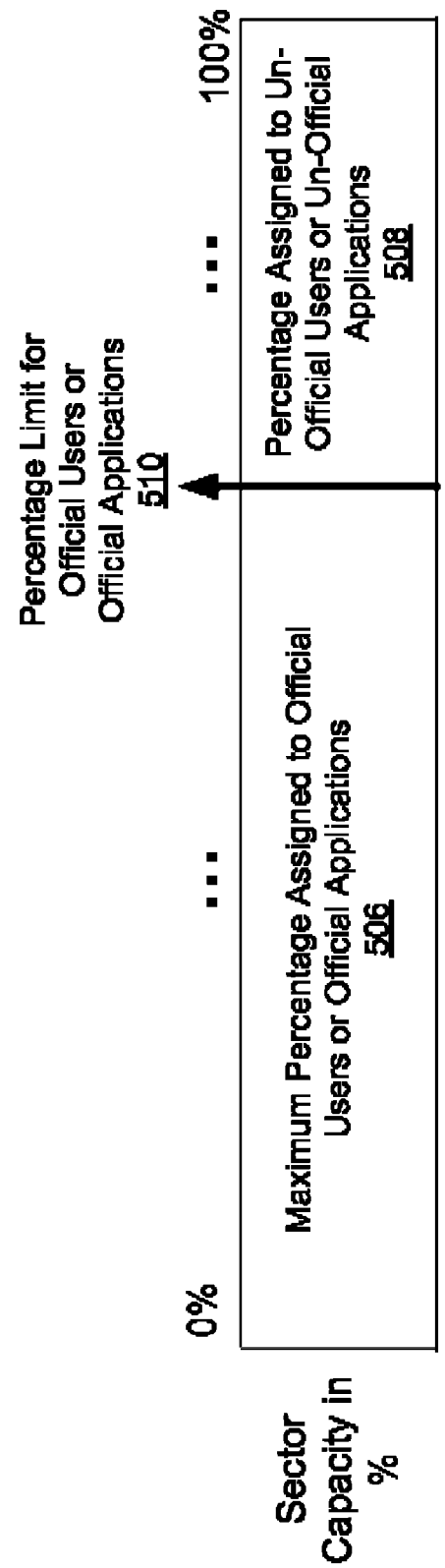
FIG. 5B shows an exemplary concept for allocating sector capacity in a congested communications network.

In another optional aspect the network could have the ability to reallocated resources in order to provide assured access to official users. The reallocation could be dynamic allowing for the most efficient use of resources. On a commercial communication network it is advantageous to have optimized resources. In an aspect the network could accomplish this by allocating a percentage of total sector capacity to official users or official use applications. FIG. 5A demonstrates an allocation scheme when the network is not congested. The total sector percentage 504 is assigned to all users or applications both official and unofficial. FIG. 5B demonstrates an allocation scheme when the network is congested. There could be a total sector percentage limit 510 for official users or official use applications. Then a percentage of the total sector capacity is assigned to only official users or applications 506 and the rest of the sector capacity is assigned to un-official users or applications 508. The network could also use the QoS and priority information for admission control, congestion control and access control. For example, the network could use the priority information to set network persistence values. During an emergency when the network would be congested, the network could reduce, limit, or block unofficial use applications or un-official users from being able to make access attempts. The network could also reallocate resources to assure access for official users. For example, by changing the QoS for un-official users, lowering the data rates of un-official users, dropping un-official users from the network, or any combination of these aspects.

In another optional aspect, the network would help facilitate end to end processing for the official use applications. For example, the communications network could provide QoS indications to any external data network to facilitate the end-to-end QoS for first applications associated with official use.

Figure 7:
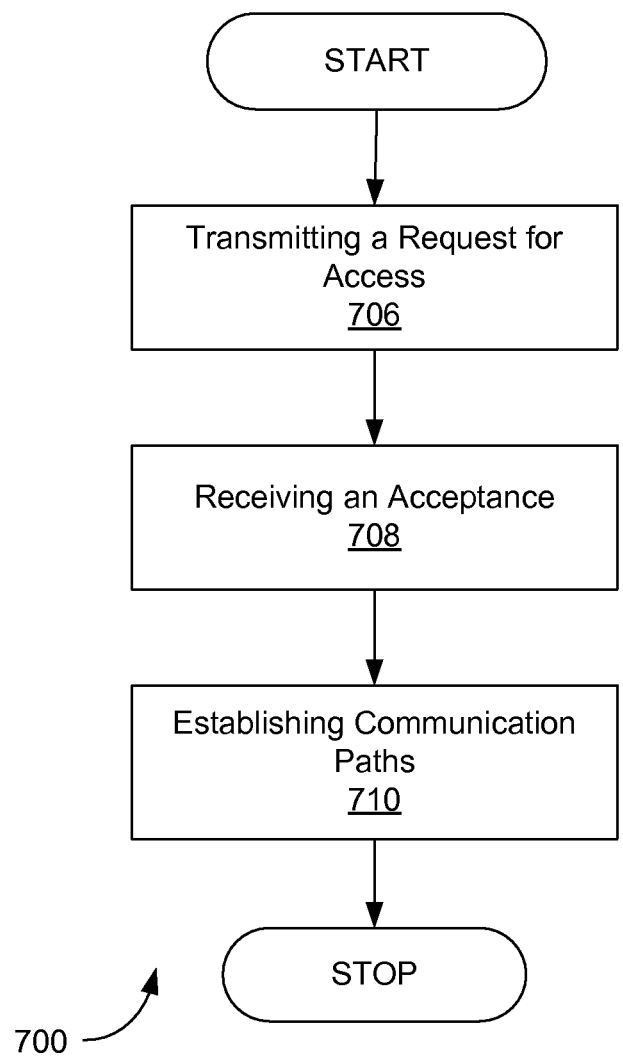
FIG. 7 shows an exemplary process for an access terminal to gain assured access on a communication system.

FIG. 7 is a flow diagram of a process 700 that may be performed at an access terminal to implement the various acquiring processing techniques described herein. A request for access from the AT, for packet data services based on an application, is then sent to the AP (step 706). The application is either one of official use or un-official use. The application could have a priority level associated with it. The AT then receives acceptance of the request for access (step 708). As a result of the request and acceptance communication paths for the packet data services are then established (710).

Figure 8:
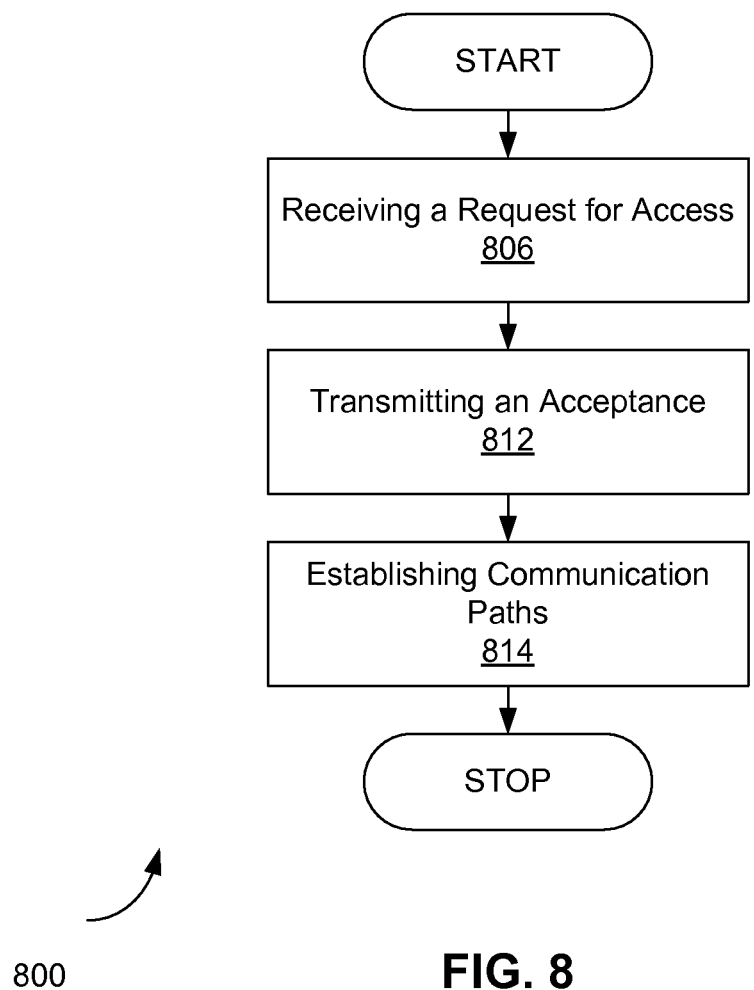
FIG. 8 shows an exemplary process for a network to establish an assured access communication session with an access terminal.

FIG. 8 is a flow diagram of a process 800 that may be performed at an access point to implement the various providing processing techniques described herein. Initially, the AP receives a request for access from an AT (step 806). The request is for packet data services based on the AT's application. The application is either one of official use or un-official use. The application could have a priority level associated with it. The AP on its own or in conjunction with the network authorizes and transmits an acceptance of services to the AT (step 812). As a result of the request and acceptance communication paths for the packet data services are then established (814).

Figure 9:
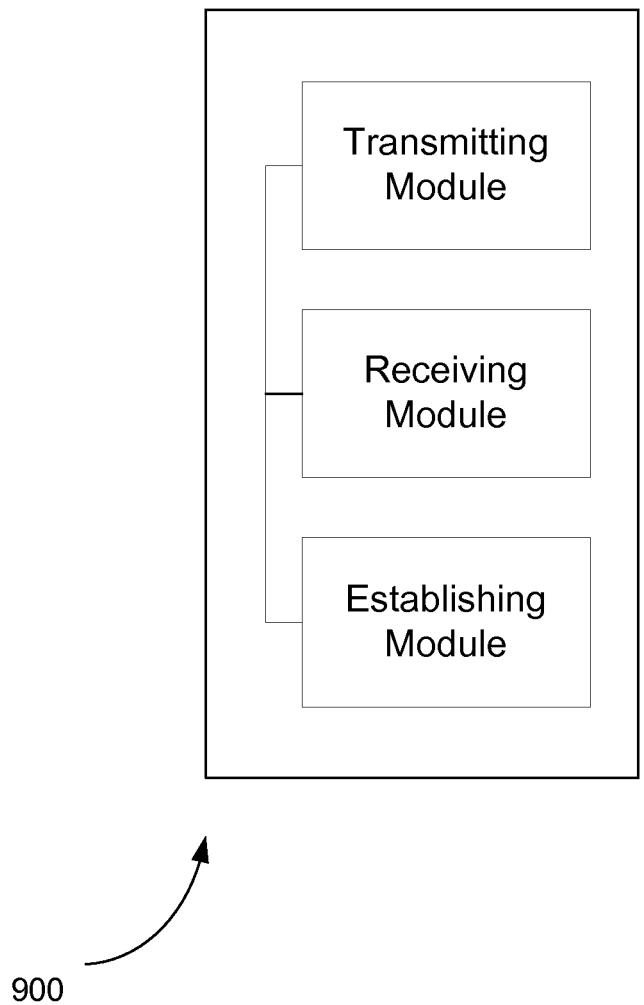
FIG. 9 shows an example of an apparatus for acquiring packet data services associated with a communication network.

FIG. 9 demonstrates an AT 900 that comprises a transmitting module that transmits a request for access from the AT, for packet data services based on an application. The application is either one of official use or unofficial use. The application could have a priority level associated with it. A receiving module that receives an acceptance for the request for access. An establishing module that establishes the communication paths for the packet data services.

Figure 10:
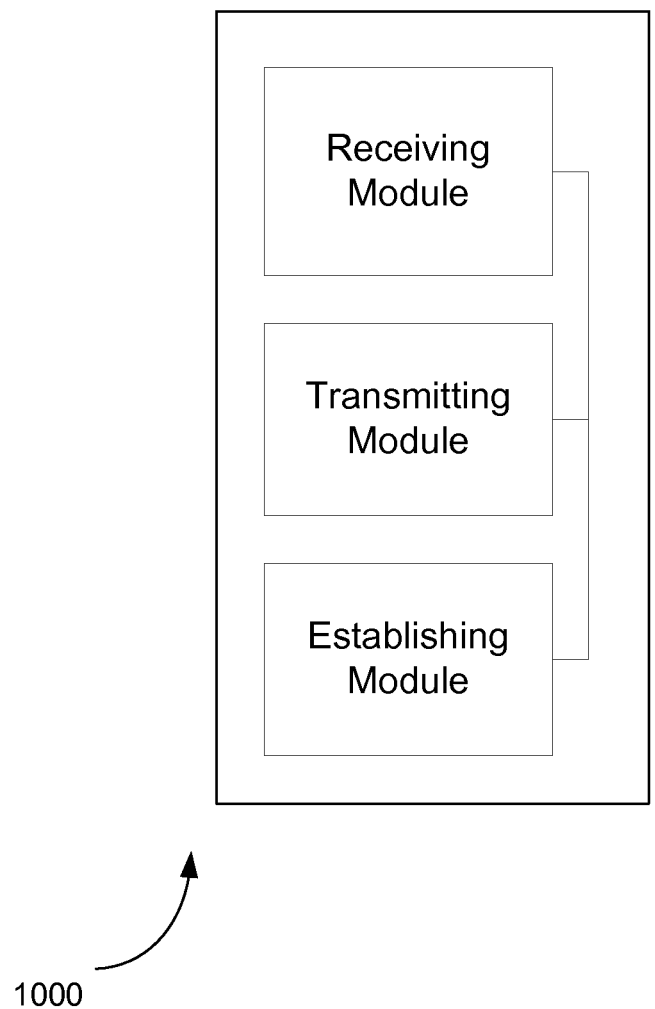
FIG. 10 shows an example of an apparatus for providing packet data services associated with a communication network.

FIG. 10 demonstrates an AP 1000 that comprises a receiving module that receives a request for access for packet data services based on an application. The application is either one of official use or un-official use. The application could have a priority level associated with it. A transmitting module that transmits an acceptance. An establishing module that establishes the communication paths for the packet data services.

Figure 11:
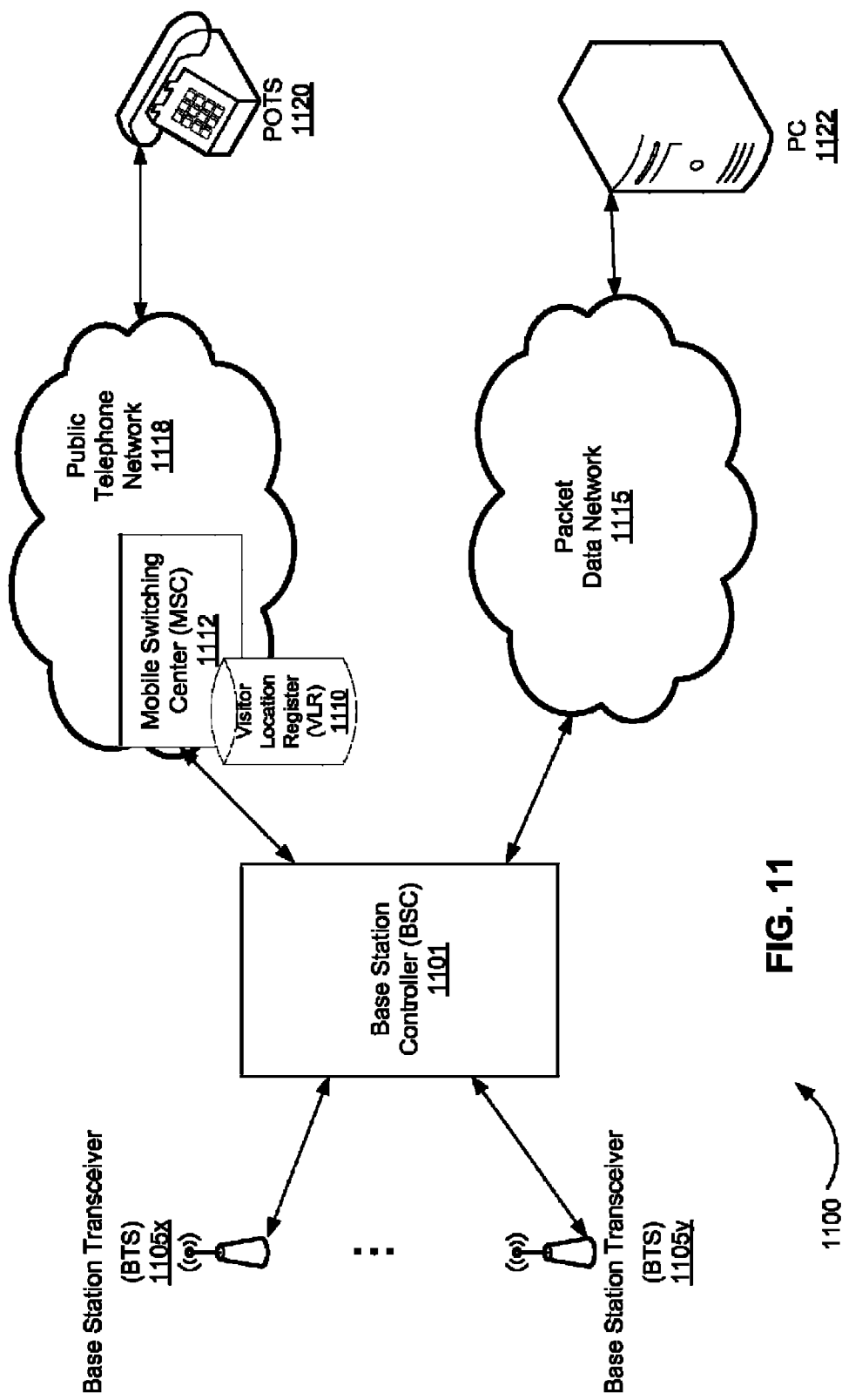
FIG. 11 shows an exemplary commercial access point and network.

FIG. 11 demonstrates an exemplary wireless base station and other network components 1100. The Base Station Transceivers (BTS) 1105x and 1105y are responsible for the reception and transmission of radio frequency (RF) signals between the base station and the mobiles. A BTS could comprise, for example, antennas, a tower, power amplifiers, modulators and demodulators, and encryptions and decryptors. They relay information to the Base Station Controllers (BSC) 1101. Several BTSs, also called access points or node-Bs, could communicate with one or more BSC. Only two BTSs and one BSCs are shown here for simplicity, but a network comprises many BTSs in connection with one or more BSCs. The BSC directs the operation of the base station. The BSC is responsible, for example, setting up and tearing down calls, selecting and allocating channel resources, and controlling handovers. The BSC, amongst other things, is comprised of many hardware and software modules. For example, digital and analog switches, racks, processors, power supplies, memory, buses, and cables. The BSC, also called a Radio Network Controller (RNC) typically has a "backhaul" connection to the Mobile Switching Center (MSC) 1112 which controls the BSC and provides call control capability. The MSC also typically keeps track of the mobile, also called access terminals, and the various networks. The MSC utilizes many databases such as a Visitor Location Register (VLR) 1110 in order to manage the communications between mobile user and the other networks. The VLR temporarily stares information about each mobile within the area served by that MSC. A Home Location Register (HLR) is another database that the MSC uses and is the central database for all the subscribers which contains details on the identity of each subscriber, the services to which they have access and the locations where the subscriber was last registered. MSCs that connect to the Public-switched telephone network (PSTN/ISDN) or public telephone networks 1118 are typically called gateway MSCs. Land line plain old telephone service (POTS) 1120 is part of the public telephone network. Personal computers (PCs) 1122 connect to the packet data network. The packet data network 1115 is comprised of things like the Internet or General Packet Radio Services (GPRS).

Figure 12:
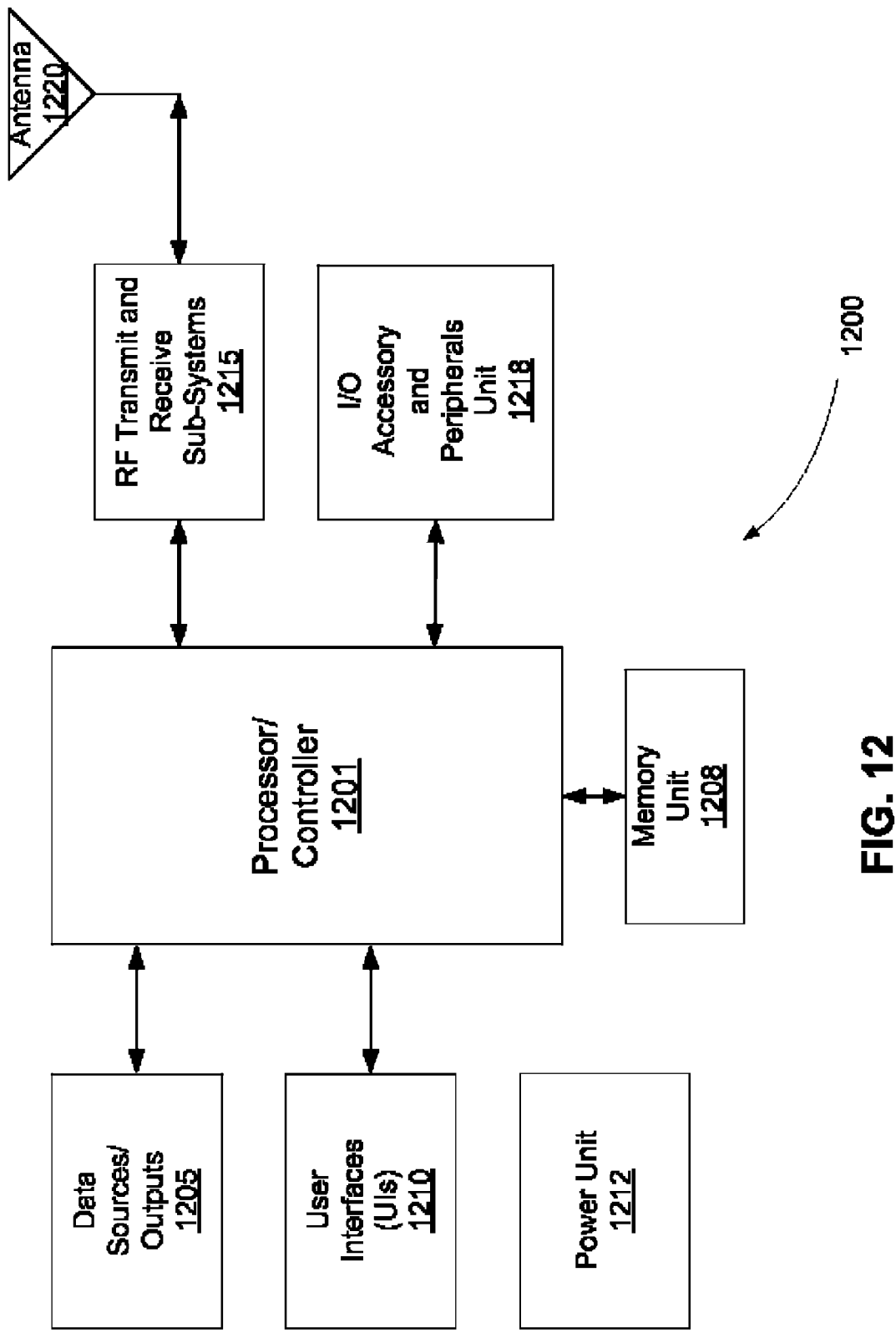
FIG. 12 shows an exemplary access terminal.

FIG. 12 demonstrates an exemplary mobile 1200. The mobile has an Antenna 1220 for receiving and transmitting radio frequency (RF) signals. Only one antenna is shown for simplicity, but more than one antenna could be employed. The RF Transmit and Receive Sub-Systems 1215 are responsible for primarily conditioning the signals from the baseband to the RF band and could comprise, for example, filtering, up converting and down converting, modulating and demodulating. The Sub-Systems could comprise, for example, power amplifiers, filters, switches, VCOs, PLLs, oscillators, ADC and DAC. The User Interfaces (UIs) 1210 allow input and output of information between the mobile device and the user. UIs could comprise, for example, keypads, displays, LEDs, microphones, speakers, or vibrators. Data Sources/Outputs 1205 could be any number of data sources or outputs to and from the Processor/Controller 1201. For example, a data source could be a PCM signal, packet data, or MPEG stream; basically, any data to or from any I/O on the mobile device to and from the processor/controller. I/O Accessory and Peripheral Unit 1218 is responsible for coordinating and controlling the input and output of the peripherals or accessories in conjunction with the Processor/Controller. The I/O Accessory and Peripheral Unit could comprise, for example, memory, adapters, plugs, buses, micro-controllers, micro-processors, amplifiers, filters, transceivers, transducers, and modems. Examples are: hands free kits, headsets, Bluetooth devices, cameras, IrDA, RS232, JTAG, and USB. The Processor/Controller 1201 is responsible for coordinating and managing all aspects of the mobile's functions. For example, coordinates the timing, stores and executes software codes, compresses and converts data, directs the flow and traffic of data, control peripherals and the user input, manages the power resources. The Processor/Controller could comprise one or more devices, and could be for example, a microprocessor, a DSP, or an ASIC. Memory Unit 1208 is connected to the Processor/Controller and could comprise one or more devices. The Memory Unit supports the Processor/Controller. The Memory Unit 1208 could comprise, for example, EEPROM, RAM, Flash, external memory card, DSRAM, or a PLD. Power Unit 1212 supplies power to the mobile device. Power Unit 1212 could comprise more than one battery, filters, VCOs, LDRs, or plugs and adapters for DC power input.

Exemplary mobile 1200 could be an example of an access terminal and exemplary wireless base station 1100 could be an example of an access point for the various disclosed aspects. The base station 1100 could receive a request for access by way of the BTS and BSC. The base station could then transmit an acceptance by way of the BSC and BTS in conjunction with the network. The BTS and BSC in conjunction with network could establish the necessary communication paths. In another aspect, the mobile 1200 would establish a session with the base station 1100 by way of the mobile's Antenna 1220, RF Transmit and Receive Sub-Systems 1215, and Processor/Controller 1201. The mobile could then transmit a request for access based on an application by way of the Processor/Controller 1201 and Memory Unit 1208. There could be more than one processor and memory unit allowing the official use applications to have their own processor and memory associated for their use. The mobile could then receive an acceptance from the base station and establish the communication paths for the application. The details and necessary requirements for a communication network, including a mobile station, to operate are well known in the art and no further description is necessary or provided for in this document. The functionality implemented depends upon the particular application and design constraints imposed on the overall system. One skilled in the art would know how to implement the various disclosed aspects on a communication network.

Those skilled in the art would further appreciate that the various illustrative logical blocks, modules, and steps described in connection with the aspects disclosed herein may be implemented as hardware, software, firmware, or any combination thereof and hardware implementation may be digital, analog or both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

The various illustrative logical blocks, and modules described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

An exemplary storage medium is coupled to the processor such the processor could read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The steps or functions of a method or algorithm described in connection with the aspects disclosed herein may be embodied directly in hardware, in software executed by a processor, or in a combination of the two. The steps or functions could be interchanged without departing from the scope of the aspects.

If the steps or functions are implemented in software, the steps or functions may be stored on or transmitted over as one or more instructions of code on a computer-readable medium. Computer-readable media includes both computer storage media and communication media including any media that facilitates transfer of a computer program from one place to another. A storage media may be any available media that could be assessed by a general purpose or special purpose computer. By way of example, and not limitation, such computer-readable media could comprise RAM, flash memory, ROM, EPROM, EEPROM, registers, hard disk, a removable disk, a CD-ROM, optical disk storage, magnetic disk storage, magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source, using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically. A computer program product would also indicate materials to package the CD or software medium therein. Combinations of the above should also be included within the scope of computer-readable media.

The previous description of the certain aspects is provided to enable any person skilled in the art to make or use the invention. Various modifications to these aspects will be readily apparent to those skilled in the art, and the generic principles defined herein may be applied to other aspects without departing from the scope of this disclosure. Thus, this disclosure is not intended to be limited to the aspects shown herein but is to be accorded the widest scope consistent with the principles and novel features disclosed herein.

What is claimed is:

1. A method for providing packet data services, comprising:
   receiving, at an access point associated with a communications network, a first request from an access terminal based on a first application having a first priority and a second request from the access terminal based on a second application having a second priority, wherein the first priority corresponds to an official use and the second priority corresponds to an unofficial use, and wherein the first priority has priority over the second priority;
   transmitting an acceptance for access to the access terminal, wherein the acceptance is based on the use and the priority associated with the first application and the second application;
   allocating a first amount of a sector capacity of the communications network for the first application and the second application when the communications network is not congested, and allocating a second amount of the sector capacity for the first application and a third amount of the sector capacity for the second application when the communications network is congested;
   establishing at least one communication path with the access terminal for the first application and the second application; and
   wherein allocating the second amount of the sector capacity comprises reallocating the second amount of the sector capacity to include resources previously allocated to an existing communication path previously established for another application having the second priority after reducing a QoS of the another application.

2. The method of claim 1, wherein the first priority and the second priority are associated with a range of priority levels, and further wherein the first priority is assigned from a relatively higher one of the range of priority levels as compared to a priority level of the second priority.

3. The method of claim 1, wherein each of the first application and the second application is associated with at least one quality of service (QoS), and wherein the acceptance is further based on the at least one QoS.

4. The method of claim 1, further comprising:
   allocating more resources to support the official use than the un-official use.

5. The method of claim 1, further comprising:
   supporting both official use and un-official use applications.

6. The method of claim 5, wherein the supporting comprises:

setting a limit on an amount of sector capacity for supporting official use applications.

7. The method of claim 1, further comprising:
determining whether each of the first application and the second application is associated with official use or unofficial use based on the priority; and
managing subscriber accounts based on the determination.

8. The method of claim 1, wherein transmitting an acceptance for access to the access terminal, further comprises:
verifying each of the first application and the second application based in part on a QoS profile corresponding to the access terminal.

9. The method of claim 1, wherein the priority in the request is used for at least one of access control, admission control, and congestion control.

10. The method of claim 1, wherein the corresponding priority of the application defined in the request comprises a dynamic priority adjusted based on a circumstance corresponding to the request.

11. The method of claim 10, wherein the dynamic priority is defined by a requested user adjustment to an original priority, and further comprising authorizing the dynamic priority for a temporary period of time.

12. The method of claim 1, wherein the first amount of the sector capacity for the first application having the first priority is equal to the first amount of the sector capacity for the second application having the second priority.

13. The method of claim 1, wherein the second amount of the sector capacity for the first application having the first priority is greater than the second amount of the sector capacity for the second application having the second priority.

14. The method of claim 1, wherein use of applications having the first priority corresponding to the official use on the access terminal is billed differently from use of applications having the second priority corresponding to the unofficial use on the access terminal.

15. A method for acquiring packet data services associated with a communications network, comprising:
transmitting, by an access terminal, a first request for access to the communications network based on a first application having a first priority and a second request based on a second application having a second priority, wherein the first priority corresponds to an official use and the second priority corresponds to an unofficial use, and wherein the first priority has priority over the second priority;
receiving an acceptance for access from the communications network, wherein the acceptance is based on the use and the priority associated with the first application and the second application;
establishing at least one communication path with the communications network for the first application and the second application;
wherein a first amount of a sector capacity of the communications network is allocated for the first application and the second application when the communications network is not congested, and a second amount of the sector capacity is allocated for the first application and a third amount of the sector capacity is allocated for the second application when the communications network is congested; and
wherein the second amount of the sector capacity is further based on a network reallocation of the second amount of the sector capacity to include resources previously allocated to an existing communication path previously established for another application having the second priority after reducing a QoS of the another application.

16. The method of claim 15, wherein the first priority and the second priority are associated with a range of priority levels, and further wherein the first priority is assigned from a relatively higher one of the range of priority levels as compared to a priority level of the second priority.

17. The method of claim 15, wherein each of the first application and the second application is associated with at least one quality of service (QoS), and wherein the acceptance is further based on the at least one QoS.

18. The method of claim 15, wherein the corresponding priority of the application defined in the request comprises a dynamic priority adjusted based on a circumstance corresponding to the request.

19. The method of claim 18, further comprising receiving a requested user adjustment to an original priority to define the dynamic priority, and further comprising receiving an authorization of the dynamic priority for a temporary period of time.

20. The method of claim 15, wherein the first amount of the sector capacity for the first application having the first priority is equal to the first amount of the sector capacity for the second application having the second priority.

21. The method of claim 15, wherein the second amount of the sector capacity for the first application having the first priority is greater than the second amount of the sector capacity for the second application having the second priority.

22. The method of claim 15, further comprising:
receiving a request to launch the first application, wherein the application has the first priority corresponding to the official use;
receiving application-specific secure login information with the request to launch the first application; and
wherein establishing the at least one communication path is based on the first application corresponding to the official use and further based on the application-specific secure login information.

23. An apparatus for providing packet data services, comprising:
means for receiving, at an access point associated with a communications network, a first request from an access terminal based on a first application having a first priority and a second request from the access terminal based on a second application having a second priority, wherein the first priority corresponds to an official use and the second priority corresponds to an unofficial use, and wherein the first priority has priority over the second priority;
means for transmitting an acceptance for access to the access terminal, wherein the acceptance is based on the use and the priority associated with the first application and the second application;
means for allocating a first amount of a sector capacity of the communications network for the first application and the second application when the communications network is not congested, and allocating a second amount of the sector capacity for the first application and a third amount of the sector capacity for the second application when the communications network is congested;
means for establishing at least one communication path with the access terminal for the first application and the second application; and
wherein allocating the second amount of the sector capacity comprises reallocating the second amount of the sector capacity to include resources previously allocated to an existing communication path previously established for another application having the second priority after reducing a QoS of the another application.

24. An apparatus for acquiring packet data services associated with a communications network, comprising:
- means for transmitting a first request for access to the communications network based on a first application having a first priority and a second request based on a second application having a second priority, wherein the first priority corresponds to an official use and the second priority corresponds to an unofficial use, and wherein the first priority has priority over the second priority;
- means for receiving an acceptance for access from the communications network, wherein the acceptance is based on the use and the priority associated with the first application and the second application;
- means for establishing at least one communication path with the communications network for the first application and the second application;
- wherein a first amount of a sector capacity of the communications network is allocated for the first application and the second application when the communications network is not congested, and a second amount of the sector capacity is allocated for the first application and a third amount of the sector capacity is allocated for the second application when the communications network is congested; and
- wherein the second amount of the sector capacity is further based on a network reallocation of the second amount of the sector capacity to include resources previously allocated to an existing communication path previously established for another application having the second priority after reducing a QoS of the another application.

25. A non-transitory computer-readable storage medium comprising:
- code for causing a computer to receive, at an access point associated with a communications network, a first request from an access terminal based on a first application having a first priority and a second request from the access terminal based on a second application having a second priority, wherein the first priority corresponds to an official use and the second priority corresponds to an unofficial use, and wherein the first priority has priority over the second priority;
- code for causing the computer to transmit an acceptance for access to the access terminal, wherein the acceptance is based on the use and the priority associated with the first application and the second application;
- code for allocating a first amount of a sector capacity of the communications network for the first application and the second application when the communications network is not congested, and allocating a second amount of the sector capacity for the first application and a third amount of the sector capacity for the second application when the communications network is congested;
- code for causing the computer to establish at least one communication path with the access terminal for the first application and the second application; and
- wherein the code for allocating the second amount of the sector capacity further comprises code for reallocating the second amount of the sector capacity to include resources previously allocated to an existing communication path previously established for another application having the second priority after reducing a QoS of the another application.

26. A non-transitory computer-readable storage medium comprising:
- code for causing a computer to transmit a first request for access to a communications network based on a first application having a first priority and a second request based on a second application having a second priority, wherein the first priority corresponds to an official use and the second priority corresponds to an unofficial use, and wherein the first priority has priority over the second priority;
- code for causing the computer to receive an acceptance for access from the communications network, wherein the acceptance is based on the use and the priority associated with the first application and the second application;
- code for causing the computer to establish at least one communication path with the communications network for the first application and the second application;
- wherein a first amount of a sector capacity of the communications network is allocated for the first application and the second application when the communications network is not congested, and a second amount of the sector capacity is allocated for the first application and a third amount of the sector capacity is allocated for the second application when the communications network is congested; and
- wherein the second amount of the sector capacity is further based on a network reallocation of the second amount of the sector capacity to include resources previously allocated to an existing communication path previously established for another application having the second priority after reducing a QoS of the another application.

27. An apparatus for providing packet data services, comprising:
- a receiving module, configured to receive, at an access point associated with a communications network, a first request from an access terminal based on a first application having a first priority and a second request from the access terminal based on a second application having a second priority, wherein the first priority corresponds to an official use and the second priority corresponds to an unofficial use, and wherein the first priority has priority over the second priority;
- a transmitting module, configured to transmit an acceptance for access to the access terminal, wherein the acceptance is based on the use and the priority associated with the first application and the second application;
- an allocation module, configured to allocate a first amount of a sector capacity of the communications network for the first application and the second application when the communications network is not congested, and to allocate a second amount of the sector capacity for the first application and a third amount of the sector capacity for the second application when the communications network is congested;
- an establishing module, configured to establish at least one communication path with the access terminal for the first application and the second application; and
- wherein the allocation module is further configured to allocate the second amount of the sector capacity by reallocating the second amount of the sector capacity to include resources previously allocated to an existing communication path previously established for another application having the second priority after reducing a QoS of the another application.

28. An apparatus for acquiring packet data services associated with a communications network, comprising:
- a transmitting module, configured to transmit a first request for access to the communications network based on a first application having a first priority and a second request based on a second application having a second priority, wherein the first priority corresponds to an official use and the second priority corresponds to an unofficial use, and wherein the first priority has priority over the second priority;

a receiving module, configured to receive an acceptance for access from the communications network, wherein the acceptance is based on the use and the priority associated with the first application and the second application;

an establishing module, configured to establish at least one communication path with the communications network for the first application and the second application;

wherein a first amount of a sector capacity of the communications network is allocated for the first application and the second application when the communications network is not congested, and a second amount of the sector capacity is allocated for the first application and a third amount of the sector capacity is allocated for the second application when the communications network is congested; and wherein the second amount of the sector capacity is further based on a network reallocation of the second amount of the sector capacity to include resources previously allocated to an existing communication path previously established for another application having the second priority after reducing a QoS of the another application.

29. An apparatus for providing packet data services, comprising:

a processor configured to:
receive, at an access point associated with a communications network, a first request from an access terminal based on a first application having a first priority and a second request from the access terminal based on a second application having a second priority, wherein the first priority corresponds to an official use and the second priority corresponds to an unofficial use, and wherein the first priority has priority over the second priority;

transmit an acceptance for access to the access terminal, wherein the acceptance is based on the use and the priority associated with the first application and the second application;

allocate a first amount of a sector capacity of the communications network for the first application and the second application when the communications network is not congested, and to allocate a second amount of the sector capacity for the first application and a third amount of the sector capacity for the second application when the communications network is congested;

establish at least one communication path with the access terminal for the first application and the second;

wherein the processor is further configured to allocate the second amount of the sector capacity by reallocating the second amount of the sector capacity to include resources previously allocated to an existing communication path previously established for another application having the second priority after reducing a QoS of the another application; and a memory unit coupled to the processor for storing data.

* * * * *